United States Patent [19]
Mitchell David C. et al.

[11] 3,740,512
[45] June 19, 1973

[54] METHOD FOR ADHERING FRICTION MATERIAL TO RING-LIKE ELEMENT

[75] Inventors: David C. Mitchell, Bloomfield Hills; Charles W. Latreille, Detroit, both of Mich.

[73] Assignee: D.A.B. Industries, Inc., Detroit, Mich.

[22] Filed: Dec. 6, 1971

[21] Appl. No.: 204,859

[52] U.S. Cl. .......... 219/10.41, 219/9.5, 219/10.53, 219/10.73
[51] Int. Cl. ............................................. H05b 5/08
[58] Field of Search .................. 219/10.49, 10.53, 219/10.79, 10.57, 10.41, 10.43, 10.67, 10.73, 10.75, 9.5

[56] References Cited
UNITED STATES PATENTS

| | | | |
|---|---|---|---|
| 2,479,980 | 8/1949 | Stanton | 219/9.5 |
| 3,467,806 | 9/1969 | Dixon | 219/9.5 |
| 2,520,978 | 9/1950 | Super | 219/10.53 X |
| 2,024,906 | 12/1935 | Bennett | 219/10.79 X |
| 2,642,919 | 6/1953 | Kingman | 219/10.53 X |
| 2,241,312 | 5/1941 | Luty | 219/10.53 X |
| 3,401,248 | 9/1968 | Kim | 219/10.53 |

Primary Examiner—J. V. Truhe
Assistant Examiner—B. A. Reynolds
Attorney—Edward A. Craig

[57] ABSTRACT

A method is provided for adhering friction material to a metallic ring-like element to form clutch elements of the type generally utilized in automatic transmissions. In a preferred embodiment, the ring-like element is precoated with an adhesive material on both sides. The adhesive is then dried to a non-tacky state. A ring of friction material is then positioned on either side of the metallic ring-like element. This assembly is then placed in a press which includes an electrically conductive ring which constitutes a one turn coil. The press is closed to apply pressure to the assembly. At the same time, alternating current is caused to flow in the one turn coil to create a magnetic field which induces current flow in the metallic ring-like element. The flow of current causes the metallic ring-like element to become hot as a result of resistance and hystereses losses. The heat causes the adhesive material to bond the friction material to the metallic ring-like element.

4 Claims, 7 Drawing Figures

Patented June 19, 1973

INVENTORS
DAVID C. MITCHELL
CHARLES W. LATREILLE

BY

ATTORNEYS

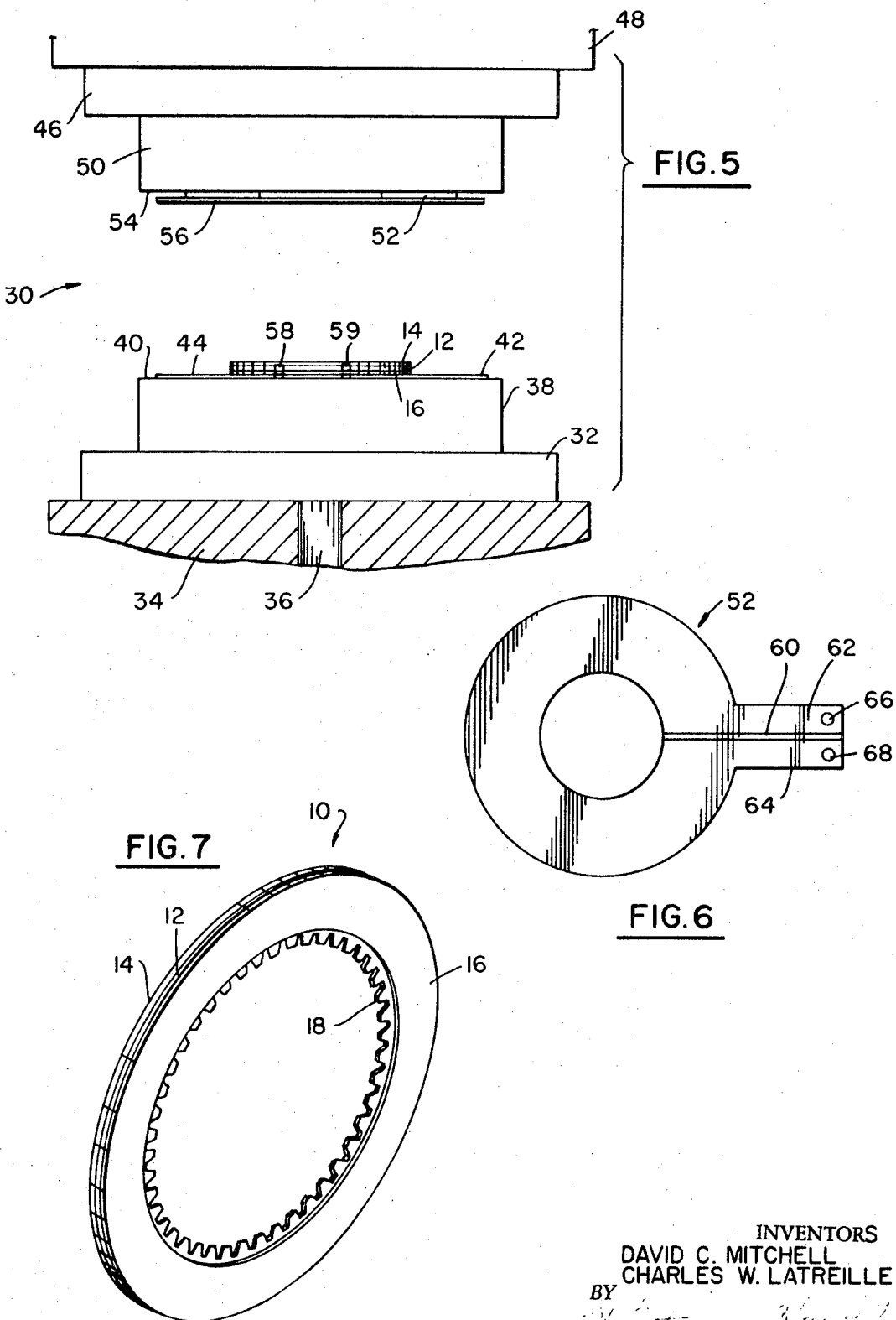

METHOD FOR ADHERING FRICTION MATERIAL TO RING-LIKE ELEMENT

BACKGROUND OF THE INVENTION

The present invention is particularly useful in manufacturing clutch elements of the type commonly utilized in automatic transmissions. A stack of alternate bare metal rings and rings having friction material thereon are provided in automatic transmissions for engaging and disengaging the drive. It has been expensive to glue the friction material to the rings in the past because the methods utilized have had certain inherent disadvantages.

One method which has been used extensively in the past is a batch process in which stacks of ring assemblies comprising alternating layers of friction rings and metal rings coated with adhesive have been pressed together in a column and then subjected to heat in an oven to cause the adhesive to bond the friction rings to the metal rings. Not only is this process time consuming but if for some reason there is poor adhesion, a large amount of scrap occurs. Additionally, the friction material is, in this method, subjected to heat for a relatively long period of time. Such heat may be damaging to some of the ingredients which form the composition of the friction material.

Another technique which has been used has been somewhat similar to the technique employed in the present invention in that a press having heated platens is used to heat up a ring assembly comprising a metallic ring-like element with rings of friction material being positioned at either side thereof. The disadvantages of this system are again, the time required to complete the process. Normal time is about twenty minutes as opposed to from 3 to 10 seconds in accordance with the present invention. The capital investment required with such a slow process is considerably higher than which is required with the present method. In this process also, the friction material must be subjected to an elevated temperature for a relatively prolonged period. In the present invention, the high temperature is applied for only a very short time and is not applied to the operating surface, the high temperature being applied only to the surface adjacent the central metallic ring.

The present method is also advantageous in that it permits very accurate control of the heat applied both in terms of temperature and rate of heating which leads to a good bond, the method permits frequent inspection, close control of the compression of the friction material with resultant close control over the final density thereof, simultaneous embossment of grooving patterns may be provided in the friction material by means of a suitable pattern applied thereto during compression of the friction material, and the present method permits the use of various heat sensitive ingredients in the composition of the friction material to thus permit usage of desired friction material which might otherwise not be usable.

SUMMARY OF THE INVENTION

The method of the invention is for adhering friction material to a metallic ring-like element to form a clutch element. The method comprises the steps of first coating a surface of one of the friction material and metallic ring-like elements with an adhesive which will cause a bond upon the application of heat. The friction material and ring-like element are then placed in contact with the adhesive therebetween. Preferably, the adhesive is dried to a non-tacky state before the friction material and ring-like element are placed in contact. Pressure is then applied to the friction material and ring-like element. An electrically conductive winding is placed adjacent the ring-like element. Alternating electrical energy is then applied to the winding to create an electrical field which induces current flow in the ring-like element. The ring-like element is heated as a consequence of the induced current flow. The induced current flow is maintained for a period sufficient to bond the friction material to the ring-like element.

IN THE DRAWINGS

FIG. 5 is a front elevational view of apparatus for simultaneously applying pressure and heating the ring-like metallic element of FIG. 1 with ring-like friction elements of FIG. 2 in contact with opposite faces thereof to thereby adhere the ring-like elements together in accordance with another step of the present invention;

FIG. 6 is a top plan view of a conductive ring utilized as a one turn winding in the apparatus of FIG. 5 for inductive heating of the ring-like metallic element during the adhering step of FIG. 5; and FIG. 7 is a view in perspective of a completed clutch plate produced in accordance with the method of the present invention.

Figure 1:
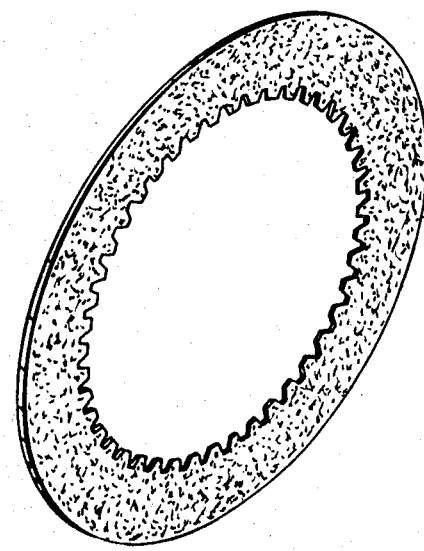
FIG. 1 is a view in perspective of a metallic ring-like element utilized in the fabrication of a clutch plate in accordance with one embodiment of the present invention.
Figure 2:
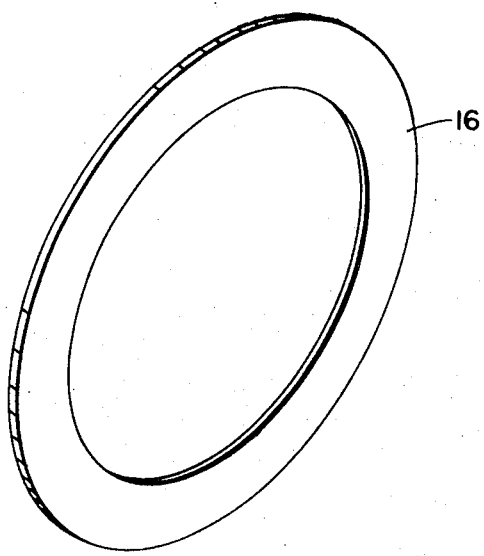
FIG. 2 is a view in perspective of a ring-like friction element which is adhered to one face of the plate of FIG. 1 in accordance with the method of the present invention.

FIGS. 1, 2 and 7 illustrate the elements acted upon and the final product produced in accordance with the present invention. The final product is illustratively a ring-like clutch plate 10 of the type generally used in automatic vehicle transmissions. The clutch plate 10 is a sandwich structure comprising a central metallic ring-like element having adhered to the opposite faces thereof ring-like friction elements 14, 16. The element 12 is fabricated of, for example, steel, and is of smaller inner diameter than the elements 14, 16. A tooth structure 18 is formed on the inner periphery of the element 12 in the area not covered by the elements 14, 16. The tooth structure 18 is adapted for slidable reception on a splined shaft.

The elements 14, 16 may be fabricated of a paper-like friction material. Such material may vary in composition depending upon the particular characteristics desired for satisfactory functioning in the intended use. Commonly, the composition may include cellulose fibers, asbestos fibers, synthetic resinous fibers along with various modifying agents to control the frictional and wear characteristics, such agents being various fills such as red iron oxide and various resins. Some of the materials included in the composition will deteriorate upon exposure to high temperatures. For example, synthetic resinous fibers, resinous particles, saturated resins and cellulose are heat sensitive. For this reason, it is important that the friction elements 14, 16 not be exposed to high temperatures for any extended period during the step of adherence thereto to the metallic element 12.

Other friction materials, such as a semi-metallic or a plastic material, may also be used to fabricate the elements 14, 16.

Figure 3:
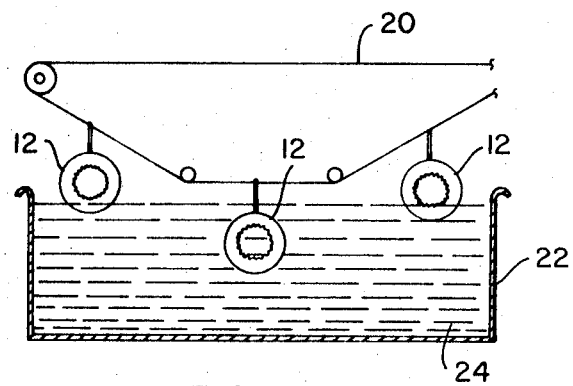
FIG. 3 is a diagrammatic illustration of the step of applying adhesive material to the ring-like element of FIG. 1 in accordance with one step of the method of the present invention.
Figure 4:
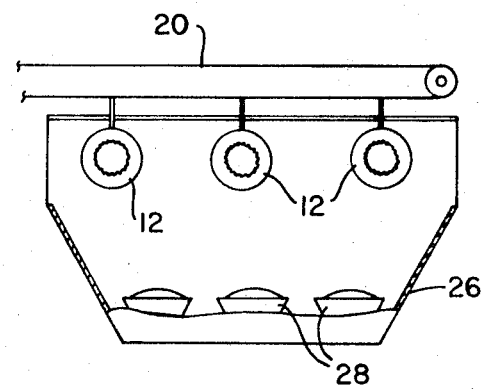
FIG. 4 is a diagrammatic illustration of the step of drying the adhesive material after application as in FIG. 3 in accordance with another step of one embodiment of the present invention.

FIG. 3 illustrates the step of applying adhesive material to both of the opposed faces of the element 12, this being the first step in the present method. As will be noted, an element 12 is suspended from a continuous conveyor belt 20 and dipped into a tank 22 containing liquid or semi-liquid resinous adhesive material 24. The element 12 is entirely coated with the adhesive material as a result of this process. Other means for applying the adhesive may, of course, be employed. For example, the adhesive may be applied to friction elements 14, 16, it may be applied as a dry powder or an adhesive film cut to size may be sandwiched between the friction element and metallic ring.

The adhesive material may be of either a thermosetting or thermoplastic type or a material combining the characteristics of both types. A thermosetting material such as a phenolic adhesive is preferred. The adhesive material must be of the heat bondable type, this term being understood to mean an adhesive in which the bonding is directly effected by heat or accelerated thereby either to cure the adhesive or to melt it for bonding purposes.

After the element 12 is coated with the adhesive, it is passed through an oven 26 having heater elements 28. In the oven 26, the adhesive material is dried to a non-tacky state by driving off most of the solvents entrained therein. In the case of a thermoset, there may also be a slight amount of precuring that takes place. The temperature and time in the oven 26 is dictated by the particular adhesive material being used. Preferably, the major portion of any solvents in the adhesive material are driven off in the oven 26 so as not to result in blisters in the final product which would reduce the effectiveness of the bond. This intermediate step is also preferred in the method for ease of handling and to reduce the time necessary for the final adhering step. If a dry powder adhesive or a film cut to size is used, this step will not be necessary.

Referring now to FIG. 5, the metallic ring-like element 12 coated with dried adhesive on both faces thereof is then placed between a pair of ring-like friction elements 14, 16 in apparatus 30. The apparatus 30 is provided for simultaneously applying pressure and heating the ring-like metallic element 12 with the ring-like friction elements 14, 16 in contact with opposite faces thereof to thereby adhere the elements together.

The apparatus 30 comprises a lower movable platen 32 fabricated of, for example, steel. The platen 32 normally rests on a support structure 34. A ram 36 extends through an opening in the support structure 34 into connection with the platen 32. The ram 36 is connected to power means (not shown) for raising and lowering the platen 32 as desired. A rectangular block 38 fabricated of non-electrically conductive material is secured to the upper surface of the platen 32. The block 38 has a flat upper surface 40 to which is secured a flat plate 42 fabricated of an electrically non-conductive material. The sandwich structure of the ring-like elements is placed on the upper flat surface 44 of the plate 42.

The movable platen structure is in alignment with a fixed platen structure including a platen 46 secured to a fixed upper support structure 48. A block 50 fabricated of an electrically non-conductive material is secured to the platen 46. A conductive ring 52, utilized as a one-turn winding for inductive heating of the ring-like metallic element 12 during the adhering step, is secured to the lower surface 54 of the block 50. A flat plate 56 fabricated of an electrically non-conductive material is secured to the lower face of the ring 52. The plates 42, 56 are referred to as "wear plates" and may be replaced as needed after a degree of wear during use has occurred.

A pair of blocks 58, 59 are illustratively secured to the surface 44 of the plate 42 interiorly of the inner diameter of the ring 12. The blocks 58, 59 function to limit the movement of the lower platen towards the upper platen and thus control the exact ultimate thickness of the ring-like sandwich structure to result in the final desired thickness of the sandwich structure. Each ring-like sandwich is therefore compressed to the same ultimate thickness.

Referring to FIG. 6, it will be noted that the conductive ring 52 is of split-ring construction. The ring 52 is fabricated of an electrically conductive material such as copper. An electrical insulating layer 60 is provided between the split ends of the ring 52 to prevent contact therebetween. A pair of conductors 62, 64 extend from the ring 52. Posts 66, 68 are provided at the ends of the conductors for attachment of an electrical cable for providing electrical power to the ring. The ring preferably has a band width measured from the outer diameter to the inner diameter thereof of sufficient size to accommodate a range of different sized clutch plate structures. The band width is sufficient to completely overlie the spring-like friction element when the two platens are moved together. The sandwich structure comprising the elements 12, 14, 16 is placed on the lower platen in axial alignment with the ring 52.

After the elements 12, 14, 16 have been properly located on the lower platen, the lower platen is driven upwardly by means of the ram 36 until the movement is stopped by virtue of the blocks 58. At this point, the upper element 14 will have contacted the plate 56 and the elements 14, 16 will have been slightly compressed.

Alternating current is then supplied to the ring 52. A field is thus generated about the ring 52. This field induces a current in the metallic ring-like element 12. The current flow in element 12 causes the element 12 to heat up as a result of hystereses losses and electrical resistance in the event that the element 12 is fabricated of a magnetic material such as steel and primarily as a result of electrical resistance in the event that the element 12 is fabricated of non-magnetic material. This heat rise is quite rapid. The temperature rise is in the range of 400°–500° F. in an actual embodiment. The rise in temperature results in heating up the adhesive on the element 12 causing this adhesive to fully cure if it is a thermostat or melt if it is a thermoplastic, thus bonding the elements 12, 14, 16 together.

In a specific embodiment of the invention, the entire process is completed in about 3.6 seconds. The pressure applied by the platens is advantageous in that it results in the elements 14, 16 being placed in intimate contact with the adhesive to thereby result in a good bond. The pressure is also used to compress the elements 14, 16 to a desired density and total thickness of the final clutch plate.

In order to achieve the inductive heating required in accordance with the invention, the electrical input should be in the general range of from twenty to twenty thousand cycles per second. In a specific embodiment, the apparatus was designed to accommodate clutch plates having an inner diameter of 3 ¼ inches and an outer diameter of 8 inches. The ring 52 had an inner diameter of 2 ¾ inches and an outer diameter of 9 inches. The ring 52 thus had a band width which was sufficient to always cover the elements 12, 14, 16 and thus supply even pressure thereto and induce a uniform field in element 12 which resulted in desirable uniform heating thereof. In this embodiment, the electrical input was between 9,600 and 10,000 cycles per second at 6,500 watts. The voltage and current input should be sufficient to supply the power required to heat the workpiece to the required temperature in seconds. The pressure applied by the platens may, for example, be about 6,000 pounds per square inch. Embossing elements may be provided on the plates 42, 56 to simultaneously emboss a grooved or raised configuration on the outer surfaces of elements 14, 16 as desired in the final clutch plate.

The present invention possesses a number of advantages with respect to prior art techniques for manufacturing such clutch plates, namely, batch processing stacks of the clutch plates in an oven or individually placing the clutch plates in a press structure of the general type of the present invention but wherein heat is supplied by means of external heating structure, as previously described. The main advantages are as follows:

1. This is a high speed process.
2. Process permits close control of the area heated.
3. The process permits close control of the rate of heating.
4. The process facilitates good quality control because it permits frequent inspection of the finished product relative to bond and thickness.
5. The process permits embossment of the friction material simultaneously with adhering thereof to the metal ring.
6. As a result of the speed of the process, the friction material is not subjected to prolonged high temperatures which thereby minimizes damage to any heat sensitive material contained therein.
7. Heating of the metal ring only results in heating only the inner face of the friction material thus minimizing the damage to the friction material and isolating any such possible damage from the outer surface of the friction material which is actually the surface used in functioning of the product.
8. The process causes the gap in which the bonding occurs to be fixed resulting in constant thickness clutch plates.

What we claim as our invention is:

1. The method of adhering friction material to a metallic ring-like element to form a clutch plate comprising the step of applying on a surface of one of the friction material and metallic ring-like elements a layer of heat-bondable adhesive, placing the friction material and ring-like element in contact with the adhesive therebetween, applying pressure to the friction material and ring-like element, placing an electrically conductive single split ring winding having a flat surface adjacent the ring-like element, said winding having a sufficient band width as measured by the difference between the outer diameter and inner diameter thereof to completely overlie the friction material, applying alternating electrical energy to the winding to create an electrical field which induces current flow in the ring-like element, heating the ring-like ring-like as a consequence of the induced current flow, and maintaining such induced current flow for a period sufficient to bond the friction material to the ring-like element, and applying sufficient pressure to the friction material and ring-like element to cause slight predetermined compression of the friction material to achieve a predetermined density thereof and to achieve a predetermined thickness of the final clutch plate.

2. The method of claim 1, further characterized in that said adhesive material is applied as a liquid coating having solvents entrained therein, and that after said adhesive material is applied, said adhesive material is subjected to an elevated temperature to drive off solvents in the adhesive material to dry the adhesive material to a non-tacky state.

3. The method as defined in claim 2, further characterized in that the metallic ring-like element is coated with the adhesive.

4. The method as defined in claim 3, further characterized in that adhesive is applied to both surfaces of the metallic ring-like element and friction material is placed in contact with both sides of the metallic ring-like element after the drying step and prior to applying pressure thereto.

* * * * *